(12) United States Patent
Dolmansley

(10) Patent No.: US 9,816,707 B2
(45) Date of Patent: Nov. 14, 2017

(54) RECESSED FUEL INJECTOR POSITIONING

(71) Applicant: Siemens Aktiengesellschaft, Munich (DE)

(72) Inventor: Timothy Dolmansley, Worksop (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 74 days.

(21) Appl. No.: 14/647,248

(22) PCT Filed: Nov. 11, 2013

(86) PCT No.: PCT/EP2013/073516
§ 371 (c)(1),
(2) Date: May 26, 2015

(87) PCT Pub. No.: WO2014/090493
PCT Pub. Date: Jun. 19, 2014

(65) Prior Publication Data
US 2015/0316267 A1    Nov. 5, 2015

(30) Foreign Application Priority Data

Dec. 11, 2012    (EP) .................................... 12196533

(51) Int. Cl.
*F23R 3/34*    (2006.01)
*F23R 3/36*    (2006.01)
(Continued)

(52) U.S. Cl.
CPC ................ *F23R 3/343* (2013.01); *F02C 7/26* (2013.01); *F02C 7/264* (2013.01); *F02C 7/266* (2013.01);
(Continued)

(58) Field of Classification Search
CPC .. F23R 3/12; F23R 3/343; F23R 3/286; F23R 2900/00015; F23D 14/02; F02C 7/26; F02C 7/266; F23Q 9/00
See application file for complete search history.

(56) References Cited

U.S. PATENT DOCUMENTS 3,099,910 A    8/1963    Schirmer
3,455,108 A    7/1969    Sherwood
(Continued)

FOREIGN PATENT DOCUMENTS

CN    1538047 A    10/2004
CN    1675500 A    9/2005
(Continued)

OTHER PUBLICATIONS

RU Official Decision of Grant dated Jul. 15, 2016, for RU application No. 2015122419.

*Primary Examiner* — Pascal M Bui Pho
*Assistant Examiner* — Thuyhang Nguyen
(74) *Attorney, Agent, or Firm* — Beusse Wolter Sanks & Maire

(57) ABSTRACT

A combustion chamber for a gas turbine is provided. The combustion chamber has a pilot burner device, a fuel injector and an ignitor unit. The pilot burner device has a pilot body with a pilot surface which is facing an inner volume of the combustion chamber. The fuel injector has a fuel outlet for injecting a fuel into the inner volume. The ignitor unit is adapted for igniting the fuel inside the inner volume, wherein the ignitor unit is arranged at the pilot surface such that fuel which passes the ignitor unit is ignitable. The pilot body includes a recess, wherein the fuel outlet is arranged within the recess.

13 Claims, 6 Drawing Sheets

(51) Int. Cl.
   *F02C 7/264*   (2006.01)
   *F23R 3/28*    (2006.01)
   *F23D 14/02*   (2006.01)
   *F23Q 9/00*    (2006.01)
   *F23R 3/12*    (2006.01)
   *F02C 7/266*   (2006.01)
   *F02C 7/26*    (2006.01)
   *F23D 11/10*   (2006.01)
   *F23D 11/24*   (2006.01)

(52) U.S. Cl.
   CPC ............ *F23D 11/108* (2013.01); *F23D 11/24* (2013.01); *F23D 14/02* (2013.01); *F23Q 9/00* (2013.01); *F23R 3/12* (2013.01); *F23R 3/286* (2013.01); *F23R 3/36* (2013.01); *F23D 2900/00014* (2013.01); *F23R 2900/00015* (2013.01)

(56) References Cited

U.S. PATENT DOCUMENTS

| | | | |
|---|---|---|---|
| 4,821,512 A | 4/1989 | Guile et al. | |
| 6,151,899 A * | 11/2000 | Park | F23C 7/004 60/737 |
| 6,334,309 B1 | 1/2002 | Dean et al. | |
| 2004/0177616 A1 | 9/2004 | Buey et al. | |
| 2005/0164138 A1 | 7/2005 | Ruck | |
| 2009/0056340 A1 | 3/2009 | Archer et al. | |
| 2010/0275602 A1 | 11/2010 | Cant et al. | |
| 2010/0293953 A1 * | 11/2010 | Wilbraham | F23R 3/14 60/737 |
| 2011/0126509 A1 | 6/2011 | Headland et al. | |
| 2011/0265481 A1 * | 11/2011 | Koranek | F23D 17/002 60/722 |

FOREIGN PATENT DOCUMENTS

| | | |
|---|---|---|
| CN | 101802365 A | 8/2010 |
| CN | 101842636 A | 9/2010 |
| CN | 101876436 A | 11/2010 |
| CN | 102080601 A | 6/2011 |
| EP | 1456638 A2 | 9/2004 |
| EP | 1457738 A2 | 9/2004 |
| EP | 2112433 A1 | 10/2009 |
| EP | 2489939 A1 | 8/2012 |
| GB | 2337102 A | 11/1999 |
| GB | 2454247 A | 5/2009 |
| JP | 2010190540 A | 9/2010 |
| RU | 2224953 C2 | 2/2004 |
| WO | 9315364 A1 | 8/1993 |
| WO | 03054537 A1 | 7/2003 |
| WO | 2008071756 A1 | 6/2008 |

* cited by examiner

RECESSED FUEL INJECTOR POSITIONING

CROSS REFERENCE TO RELATED APPLICATIONS

This application is the U.S. National Stage of International Application No. PCT/EP2013/073516 filed Nov. 11, 2013, and claims the benefit thereof. The International Application claims the benefit of European Application No. EP12196533 filed Dec. 11, 2012. All of the applications are incorporated by reference herein in their entirety.

FIELD OF INVENTION

The present invention relates to a combustion chamber for a gas turbine having a pilot body with a recess, wherein a fuel outlet is arranged within the recess.

ART BACKGROUND

In combustion chambers for gas turbines, it is an aim to reduce the emissions, such as nitrogen oxides NOx and/or carbon monoxide CO. The temperatures inside the combustion chamber cause high CO and NOx emissions.

In order to reduce the emissions, so-called dry low emissions (DLE) combustion systems are used which typically have a main and supplementary fuel stream where the main fuel stream burns in a premixed flame mode and the supplementary fuel stream burns in a diffusion flame mode. The supplementary fuel stream, may generate a so-called pilot flame, which may be of a pure diffusion type or to some extent premixed. This stabilizes a main flame in the combustion chamber. A very lean fuel mixture is burned in the main flame. Under normal circumstances this would cause an unstable flame which is prone to dynamics. Therefore, the DLE systems use the pilot flame. The pilot flame comprises a rich or richer fuel mixture, wherein the rich or richer pilot flame is more stable than the lean main flame and the heat and radicals produced from this hot stable pilot frame stabilizes the main flame.

Ignition of liquid system in gas turbines has always proved problematic. There are many factors involved, such as the fuel flow rate, atomization of the fuel, air assistant flow rates, location of fuel injector/ignitor as well as the aerodynamics in the area of ignition. This is particularly true for Dry Low Emissions (DLE) systems as there are pilot flow rates to balance as well.

The freedom in positioning of an ignitor to achieve reliable ignition of a liquid pilot fuel is very limited. The ignitor and a respective pilot fuel injector are separate items and their locations rely on local aerodynamics inside the burner volume of the combustor such that the injected pilot fuel spray is washed over the ignitor.

However, if the local fluid flow tends to move away from the ignitor surface, then the injected pilot fuel could be swept away from the ignitor without being ignitioned.

In particular, the aerodynamics within the combustor is designed to reach an optimum efficiency at full load running. As a consequence, the aerodynamics at the ignitor is poor in a start and lightning phase of the gas turbine.

In order to improve ignition reliability, several methods have been employed such as gas assisted ignition, the use of plasma ignitors and the use of higher power ignitors. Gas assisted ignition requires a further gas supply, e.g. from gas bottles, which can be costly to maintain. Plasma ignitors currently have short lifetimes and there is no running experience of using them in a gas turbine. Higher power ignitors burn out quickly and the service life is short.

FIG. 9 shows a conventional pilot burner device, which comprises a conventional pilot body 900. A conventional pilot surface 901 of the conventional pilot body 900 is facing an inner volume (burner volume) of the conventional combustion chamber. A conventional fuel injector 902 and a conventional ignitor unit 903 are installed within the conventional pilot body 900, such that a conventional fuel spray 904 is injectable into the inner volume. A flow direction 106 of fluids in the inner volume directs the injected conventional fuel spray 904 to the conventional ignitor unit 903.

The ignition of liquid fuel in a gas turbine is often difficult. The fuel is atomized by, for example, the aid of an air assist flow. However, this may lead to a strengthening of the jet which propels the fuel into the combustion chamber and away from the fuel ignitor. This may result in a poor ignition performance.

It may happen, that the ignition performance is so bad that gas turbine engines have to be lit with gaseous fuel first and then transferred to an operation with liquid fuel.

U.S. Pat. No. 6,151,899 A discloses a lean-burn combustor for a gas turbine which comprises a pilot body. The pilot body comprises a recess in the centre section of the pilot body into which a pilot fuel injector is installed.

EP 2 112 433 A1 discloses a mixing chamber which is installed in a combustion chamber for generating a lean premixed combustion fluid with a high swirl. The mixing chamber comprises vortex generating elements such that a desired swirl in a combustion chamber is generated.

WO 2008/071756 A1 discloses a burner for a gas turbine engine, wherein a main fuel is injected by a swirler into a combustion chamber. The swirler comprises a number of vanes arranged in a circle in order to direct a fuel injection in a desired way. The swirler is also a partitioning device which divides a flow of air along a flow slot between the vanes such that a desired injection direction of the fuel and the air inside the combustion chamber is achieved.

SUMMARY OF THE INVENTION

It may be an objective of the present invention to improve the ignition performance of a combustion chamber for a gas turbine.

This objective is solved by a combustion chamber for a gas turbine and by a method of operating a combustion chamber according to the independent claims.

According to a first aspect of the present invention, a combustion chamber for a gas turbine is presented. The combustion chamber comprises a pilot burner device, a fuel injector and an ignitor unit. The pilot burner device comprises a pilot body with a pilot surface which is facing an inner volume (burner volume) of the combustion chamber. The pilot burner device further comprises a centre axis. The fuel injector comprises a fuel outlet for injecting a fuel into the inner volume. The ignitor unit is adapted for igniting the fuel inside the inner volume. Specifically, the ignitor unit is arranged at the pilot surface such that the fuel which passes the ignitor unit is injectable. The pilot body comprises a recess, wherein the fuel outlet is arranged within the recess. The recess is located and formed off-centred from the centre axis.

According to a further aspect of the present invention, a method for operating the above described combustion chamber is presented.

The combustion chamber may be an annular-type or a can-type combustor for a gas turbine. The combustion chamber may be tubular and may have a cylindrical or an oval cross-section.

The combustion chamber may comprise a main combustion section and a pre-combustion section to which a swirler device and the above described pilot burner device is mounted. A pilot flame is generated by the pilot burner device, wherein the pilot flame is used to stabilize a main flame inside inner volume.

The pilot burner device comprising the pilot surface may be attached to an end section of the combustion chamber close to a swirler device, for example. The (pilot) fuel injector of the pilot burner device is arranged at the pilot surface for injecting fuel into the inner volume.

The pilot surface is facing an inner volume (burner volume) of the combustion chamber. The pilot body is mounted to a hole in an end face of the combustion chamber. I.e., the pilot body may be mounted to an open end (e.g. a hole in the end face) of the combustion chamber. The pilot body is mounted to the end face of the combustion chamber in a detachable manner, for example. The end face of the combustion chamber is located at the most upstream location of the combustion chamber with respect to the flow of gas inside the combustion chamber. The side walls of the combustion chamber are attached to the end face and comprise an angle with respect to the end face. The side walls of the combustion chamber extend (at least with a component) from the end face along a centre axis of the combustion chamber.

The fuel injected by the fuel injector at the pilot surface is used for controlling the main flame in which the main fuel which is injected by the swirler device is burned. The injected (pilot) fuel generates a predefined flame shape. The main fuel stream is introduced via the swirler in a generally tangential direction into the combustor with respect to a centre axis of the combustion chamber. The injected main fuel stream and the pilot fuel stream may comprise a liquid fuel or a gaseous fuel. The main fuel and the pilot fuel flow after being injected into the combustion chamber generally along the centre axis away from the pilot surface. The main fuel and the pilot fuel stream may also flow slightly inclined with respect to the centre axis. The pilot fuel is ignited by the ignitor unit to form the pilot flame. The pilot flame ignites the main fuel for forming the main flame.

The centre axis of the combustion chamber may be a symmetry line of the combustion chamber and in particular of a pre-combustion section. The centre axis of the combustion chamber may in another design coincide with the centre line of the gas turbine. The centre axis of the pilot burner device may be parallel and/or coaxial with the centre axis of the combustion as described above.

Hence, the "off-centred" location of the recess at the pilot surface defines a location of the recess which is spaced apart to the centre axis of the pilot burner device. In particular, the centre axis of the pilot body does not run through the "off-centred" recess.

This means, that the recess forms a hole or a cavity which is spaced from the centre axis. In particular, the cavity forms a cylindrical profile or a cone shaped profile. Specifically, the recess may form a rotational symmetric profile. Hence, the recess comprises a symmetry axis, which is spaced apart from the centre axis of the pilot burner device.

Hence, the fuel outlet is recessed with respect to a section of the pilot surface surrounding the recess. In particular, in an exemplary embodiment, the fuel injector is recessed into the pilot body with respect to the ignitor unit, which may be placed at a section of the pilot surface surrounding the recess.

Hence, the fuel injector injects the fuel into the off-centred recess. A flow of fluid inside the inner volume (burner volume) of the combustion chamber flows along a circumferential direction within the combustion chamber around the centre axis of the pilot burner device. The flow of fluid (air/fuel mixture) passes the off-centred recess and directs the injected and atomized fuel by the fuel injector to the ignitor. By installing the fuel injector outlet within the recess a proper injection of the fuel with respect to ignitor unit is achieved without compromising the fuel atomization or the running of the fuel once the flame has lit.

Hence, a proper ignition performance is achieved.

Generally, the circulation of the combustion fluid (e.g. a fuel/air mixture) in the inner volume of the combustion chamber is directed around the centre axis and hence along a circumferential direction around the centre axis. Hence, because the recess is located off-centred with respect to the centre axis and at a circumference around the centre axis, the flow of the combustion fluid blows the injected fluid effectively in the direction to the ignitor. Furthermore, because the recess is located off-centred and does not extend all the way through the centre of the pilot surface, smaller recesses into which the respective fuel injectors are installed may be formed, so that also negative aerodynamical effects caused by larger recesses in the centre of the pilot burner surface may be reduced.

In particular, if the fuel injector is recessed into the pilot body, the fuel which is injected into the recess has more space and time to be atomized before it reaches the combustion fluid flow in the combustion chamber. Hence, the ignition performance is increased because the injected fluid had time to atomize in the recess before being directed to the ignitor unit.

Specifically, according to a further exemplary embodiment, the recess comprises a base area and a lateral surface. The base area is arranged recessed into the pilot body and spaced apart from a section of the pilot surface surrounding the recess. The lateral surface connects the section of the pilot surface surrounding the recess and the base area. Between the lateral surface and the base area an angle exists. The angle may be in a range between approximately 10° and approximately 80°, in particular approximately 30° to approximately 60°, advantageously approximately 45°.

In an exemplary embodiment, the fuel outlet is arranged at the base area. The base area may be formed by the fuel outlet, for example. Moreover, the base area may comprise a hole into which the fuel outlet may be installed, for example. Hence, the size of the base are may be similar to the fuel outlet, such that the size of the recess may be reduced.

According to further exemplary embodiments, the fuel outlet is arranged at the lateral surface.

If the fuel outlet is arranged at the lateral surface, the fuel is injected along an injecting direction which may be approximately parallel to a normal of the lateral surface. Hence, the injecting direction may be adapted such that the fuel is directed to the ignitor unit.

According to a further exemplary embodiment, the lateral surface comprises a curved shape, in particular a concave or a convex shape. Hence, corners may be prevented by the smooth curvature of the lateral surfaces such that the aerodynamic losses by the recess are reduced and turbulences may be reduced.

Furthermore, according to a further exemplary embodiment, the base area comprises a circular, elliptical or rectangular profile.

According to a further exemplary embodiment, the combustion chamber comprises an air blast injector. The air blast injector is adapted for injecting an air blast into the inner volume.

The air blast injector comprises an air blast outlet at the pilot surface, wherein the air blast outlet is arranged at the pilot surface such that the air blast is injectable in the direction to the fuel outlet and the ignitor unit for directing the fuel to the ignitor unit.

The air blast outlet of the air blast injector comprises for example a nozzle, which directs the air blast in a predefined desired direction. According to the present invention, the air blast is injected by the air blast outlet in a direction to the fuel outlet and also to the ignitor unit. For example, the air blast injector, the fuel injector and the ignitor unit are located at the pilot surface one after another, such that the injected air blast streams from the air blast outlet to the fuel injector and further to the ignitor unit. Hence, the air blast directs the injected fuel by the fuel injector to the ignitor unit.

The air blast injector injects the air blast in an injecting direction which has a (directional) component that is perpendicular to a normal of the pilot surface. In other words, the air blast is injected by the air blast injector at least partially parallel to the pilot surface and at least partially non-parallel to the normal of the pilot surface or non-parallel to the center axis of the combustion chamber. The air blast may be for example oxygen or air, i.e. compressed air.

Hence, by the approach of the present invention, the air blast which is injected by the air blast injector directs an injected fuel spray injected by the fuel injector over an ignitor head of the ignitor unit, which is located at the pilot surface, in particular during the ignition phase. Under normal operation of the gas turbine, the air blast injector and the ignitor unit may be switched off if desired.

By the present invention, specifically during the start-up phase of the gas turbine, a reliable amount of injected fuel is directed over the ignitor unit. This is possible by the air blast injected by the air blast injector. No movable parts or additional fluid guiding elements within the combustion chamber are necessary. The injected air blast may be simple controlled by a single on/off valve, for example.

According to a further exemplary embodiment, the fuel injector, the ignitor unit and the air blast injector are arranged along a circumferential direction around a centre axis of the pilot burner device. The centre axis of the pilot burner device may be parallel and coaxial with the centre axis of the combustion as described above. By arranging the fuel injector, the ignitor unit and the air blast injector along the circumferential direction means that the fuel injector, the ignitor unit and the air blast injector are spaced from each other but may comprise the same or a similar radius (distance) to the centre axis of the pilot burner device.

Generally, the circulation of the combustion fluid (e.g. a fuel/air mixture) in the inner volume of the combustion chamber is directed around the centre axis and hence along a circumferential direction around the centre axis. Hence, if the air blast injector, the fuel injector and the ignitor unit are arranged one after another along the circumferential direction, the air blast is directed at least partially along the circumferential direction of the combustion fluid streaming direction in the combustion chamber. Hence, the directing of the fuel to the ignitor unit may be more efficient because the directing of the fuel to the ignitor unit is assisted by the air blast and additionally by the streaming direction of the combustion fluid inside the combustion chamber.

According to a further exemplary embodiment, the fuel injector comprises a fuel nozzle at the fuel outlet such that the fuel is injectable in an atomized manner.

According to a further exemplary embodiment of the present invention, the air blast outlet is formed for injecting the air blast with an air blast spray cone. The air blast spray cone may comprise a conical shape for example. Hence, by injecting the air blast within an air blast spray cone, more injected fuel may be captured and directed to the ignitor unit.

According to a further exemplary embodiment of the present invention, the pilot body comprises a first passage, which connects the inner volume with an environment of the pilot burner device. The fuel injector (for example a fuel lance) is inserted into the first passage. The pilot body further comprises a second passage which connects the inner volume with the environment of the pilot burner device, wherein the air blast injector is inserted into the second passage.

Furthermore, a common passage may be formed into the pilot body according to a further exemplary embodiment of the invention. The common passage connects the inner volume with an environment of the pilot burner device, wherein the fuel injector and the air blast injector are inserted into the common passage and may in this embodiment comprise of a single unit or multiple units.

According to a further exemplary embodiment of the present invention, a further air blast injector for injecting a further air blast into the inner volume is provided. The further air blast injector comprises the further air blast outlet which is arranged at the pilot surface such that the further air blast is injectable in the direction to the fuel outlet and the ignitor unit for directing the fuel to the ignitor unit.

Specifically, the further air blast injector is spaced from the above-described air blast injector. Hence, a plurality of spaced apart air blast injectors may inject different air blast streams with different directions with respect to one and the same fuel injector outlet. Hence, a proper control and a more exact streaming direction of the fuel may be provided.

Furthermore, according to a further exemplary embodiment, a plurality of further off-centred recesses may be formed and located off-centre with respect to the centre axis of the pilot burner device. The plurality of recesses may be arranged along the circumferential direction around the centre axis. A respective further fuel injector may be installed into a respective further off-centred recess. To each fuel injector, a respective ignitor unit may be located. Further optionally, respective further air blast injectors may be located close to respective fuel injectors.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
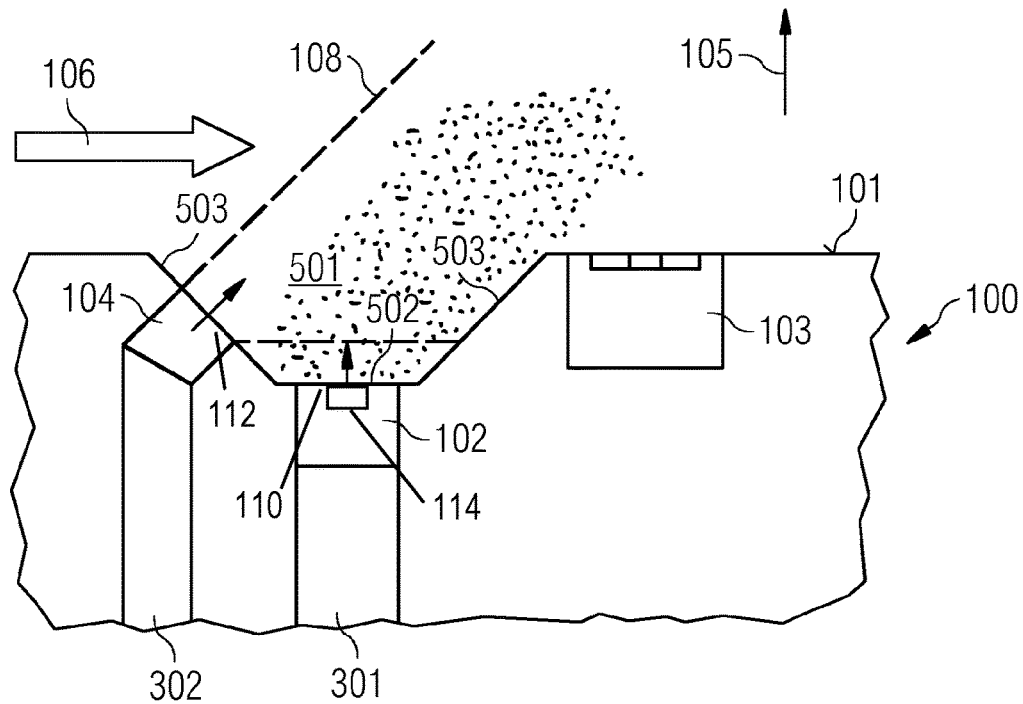
FIG. 1 shows a schematical view of a pilot burner device comprising a recess into which a fuel injector is installed according to an exemplary embodiment of the present invention.

The illustrations in the drawings are schematic. It is noted that in different figures similar or identical elements are provided with the same reference signs.

FIG. 1 shows an exemplary embodiment of a combustion chamber 120 which comprises a pilot burner device. The pilot burner device comprises a pilot body 100 with a pilot surface 101 which is facing an inner volume of the combustion chamber 120. Furthermore, a recess 501 is formed into the pilot body 100. A fuel outlet 110 of a fuel injector 102 for injecting a fuel into the inner volume is arranged within the recess 501. The recess 501 is located and formed off-centred from the centre axis 105.

Hence, the "off-centred" location of the recess 501 at the pilot surface 101 defines a location of the recess 501 which is spaced apart from the centre axis 105 of the pilot burner device. In particular, the centre axis 105 of the pilot body does not run through the "off-centred" recess 501.

For example, the fuel may be injected by the fuel injector 102 almost parallel to a normal of a section of the pilot surface 101 surrounding the recess 501 and/or parallel to a center axis 105 of the pilot burner device. In the recess 501, the injected fuel is not directly blown away from the recess 501 by a combustion fluid inside the inner volume which streams generally along a flow direction 106. In the recess 501, the fuel has time to spread and diffuse before the combustion fluid in the inner volume streaming along the flow direction 106 takes the injected fuel away to the ignitor unit 103. If the diffused and atomized fuel passes the ignitor unit 103, ignition occurs. In particular, the ignitor unit 103 is located at the pilot surface 101 further down-stream with respect to the flow direction 106 in comparison to the further upstream located recess 501 and hence the fuel injector 102.

Further upstream with respect to the flow direction 106, an air blast injector 104 for injecting an air blast into the inner volume is for example arranged to the pilot body 100. The air blast injector 104 comprises an air blast outlet 112 which is arranged upstream with respect to the flow direction 106 in comparison to the fuel injector 102 and the ignitor unit 103. The air blast is injectable in the direction to the fuel outlet and the ignitor unit 103 for directing the fuel to the ignitor unit 103. The air blast injector 104 may be arranged at a surface section of the pilot surface 101 surrounding the recess 501 (see FIG. 2) or, as can be taken from FIG. 1, arranged within the recess 501.

Specifically, the recess 501 may comprise a bottom surface 510 and define a base area 502 which is spaced from the section of the pilot surface 101 surrounding the recess 501. Furthermore, the recess 501 comprises a lateral surface 503, wherein the lateral surface 503 connects the section of the pilot surface 101 surrounding the recess 501 and the base area 502.

As can be taken in the exemplary embodiment of FIG. 1, the air blast injector 104 may be installed at the lateral surface 503.

The pilot body 100 may comprise a first passage 301 into which the fuel injector 102, such as a fuel lance, is detachably insertable. Furthermore, in particular further upstream of the first passage 301 with respect to the flow direction 106, a second passage 302 may be formed into the pilot body 100, wherein to the second passage 302 the air blast injector 104 is detachably insertable.

Figure 2:
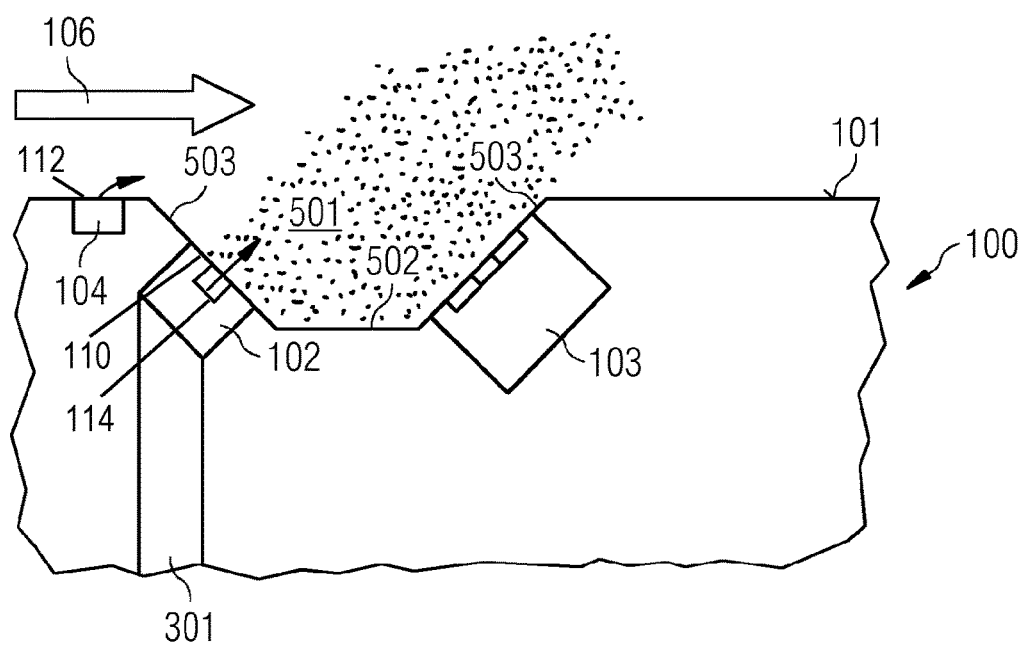
FIG. 2 shows a schematical view of a pilot burner device comprising a recess into which a fuel injector and an ignitor unit is installed, according to an exemplary embodiment of the present invention.

FIG. 2 shows a further exemplary embodiment of the present invention, wherein the recess 501 in the pilot body 100 comprises the base area 502 and the lateral surface 503. The fuel injector 102 is arranged at the lateral surface 503. Furthermore, further downstream of the fuel injector 102 with respect to the flow direction 106, the ignitor unit 103 is arranged to the base area 502 or, as shown in FIG. 2, to the lateral surface 503. The fuel injector 102 injects the fuel into the recess 501 in an atomized manner, where a fuel nozzle 114 atomizes the fuel, and wherein the fuel injector 102 directs the fuel directly to the ignitor unit 103 which is located inside the recess 501. Hence, the atomized fuel is ignited when passing the ignitor unit 103. Next, the fluid in the inner volume flowing along the flow direction 106 takes the ignited fuel away from the recess 501 and guides the ignited fuel further into the inner volume.

In order to improve the ignition efficiency, the air blast injector 104 is attached to the pilot body 100 further upstream of the fuel injector 102 and the ignitor unit 103. For example, the air blast injector 104 is located upstream of the fuel injector 102 and the ignitor unit 103 at the surface section of the pilot surface 101 surrounding the recess 501. Alternatively, the air blast injector 104 may also be located at the lateral surface 503 at a location which is located further upstream to the fuel injector 102 and the ignitor unit 103 (see e.g. in FIG. 1).

The term "upstream" and "downstream" relates to the flow direction 106 of the fluid inside the inner volume around the centre axis 105.

Figure 3:
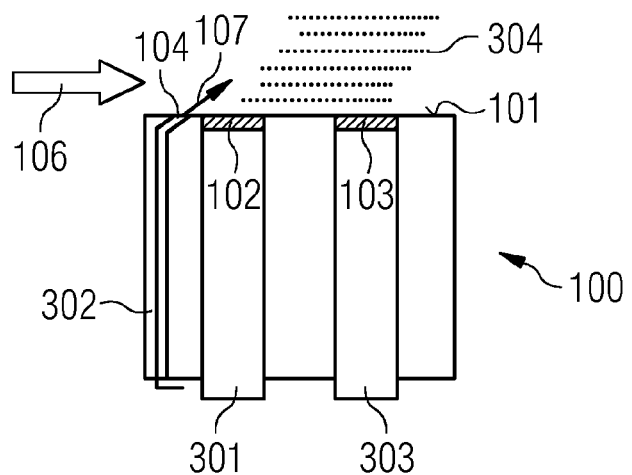
FIG. 3 shows a schematical view of a pilot burner device comprising three passages according to an exemplary embodiment of the present invention.

FIG. 3 shows a further exemplary embodiment of a pilot burner device according to the invention, wherein the pilot body 100 comprises a first passage 301 which connects the inner volume with an environment of the pilot burner device, wherein the fuel injector 102 is inserted into the first passage 301. The fuel injector 102 may be for example a fuel lance which is detachably inserted into the first passage 301 such that the fuel outlet is positioned at the pilot surface 101. Spaced apart to the first passage 301, the pilot body 100 further comprises a second passage 302 which connects the inner volume with the environment of the pilot burner device, wherein the air blast injector 104 is inserted (e.g. detachably) into the second passage 302. The air blast and fuel injectors 102 and 104 and the ignitor unit 103 may for example be tube-like in shape and extend through the pilot body.

As can be taken from FIG. 3, the fuel injector 102 injects the fuel in an atomized manner, i.e. with a fuel spray 304. The air blast injector 104 injects the air blast in an air blast injecting direction 107. As can be taken from FIG. 3, the air blast injecting direction 107 comprises a component which is almost parallel to the pilot surface 101 and comprises an angle perpendicular to a normal of the pilot surface 101.

The fuel injector 102 and hence the second passage 302 are arranged within the pilot body 100 in such a way that the air blast directs with the air blast injecting direction 107 the fuel spray 304 to the direction to a third passage 303 into which the ignitor unit 103 is arranged close to the pilot surface 101.

Furthermore, the first passage 301, the second passage 302 and the third passage 303 are arranged to the pilot body 100 in such a way, that the flow direction 106 of the combustion fluid supports the air blast injector 104. Specifically, along a flow direction 106 of the fluid inside the inner volume, first, the air blast injector 104 is located, next, the fuel injector 102 is located further downstream and finally further downstream the ignitor unit 103 is located.

Figure 4:
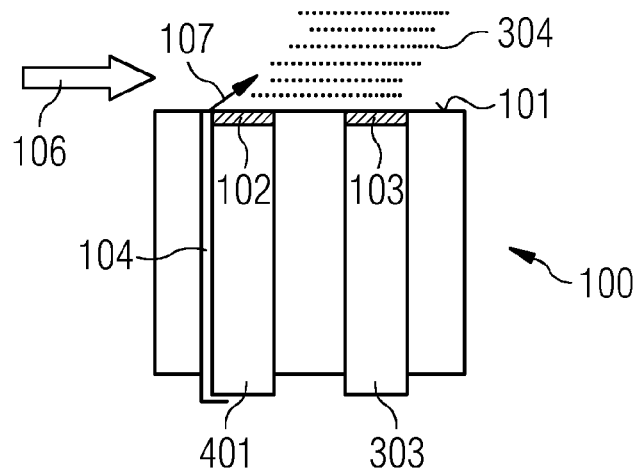
FIG. 4 shows a schematical view of a pilot burner device comprising a common passage according to an exemplary embodiment of the present invention.

FIG. 4 shows an exemplary embodiment of the pilot body 100 into which a common passage 401 is formed which connects the inner volume with an environment of the pilot burner device. The fuel injector 102 and the air blast injector are inserted together into the common passage 401. Hence, as more simple design of the pilot body 100 may be provided because for example only a common passage 401 and a third passage 303 for the ignitor unit 103 is necessary.

Figure 5:
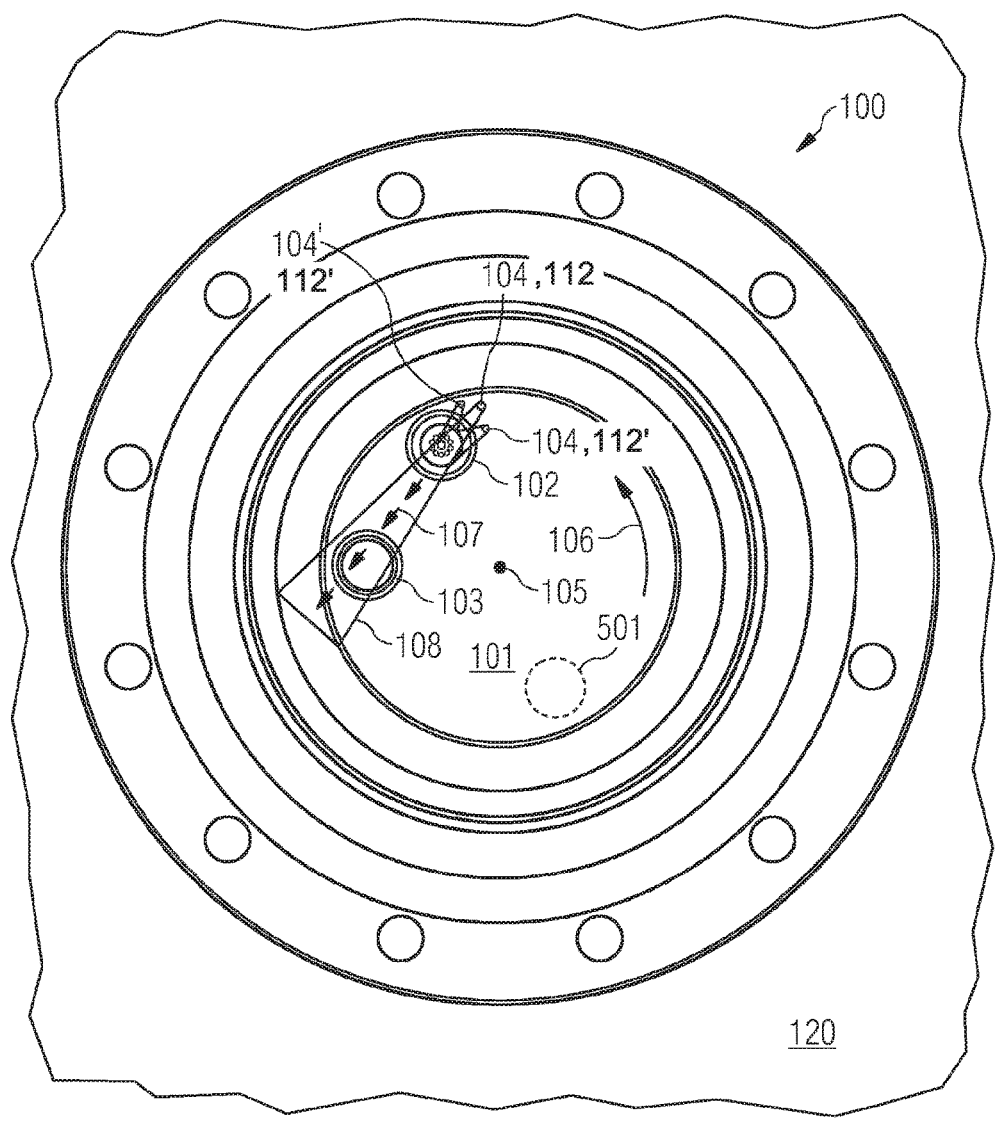
FIG. 5 shows a top view of a pilot burner device according to an exemplary embodiment of the present invention.

FIG. 5 shows a combustion chamber 120 for a gas turbine. In particular, FIG. 5 shows an end face of the combustion chamber 120. The combustion chamber 120 comprises a pilot burner device, a fuel injector 102, an ignitor unit 103 and an air blast injector 104.

The pilot burner device comprises a pilot body 100 with a pilot surface 101 which is facing an inner volume (burner volume) of the combustion chamber 120. The pilot body 100 may be mounted to an open end (e.g. a hole in the end face) of the combustion chamber 120.

The fuel injector 102 comprises a fuel outlet for injecting a fuel into the inner volume. The fuel outlet is arranged at the pilot surface 101. The ignitor unit 103 is adapted for igniting the fuel inside the inner volume, wherein the ignitor unit 103 is arranged at the pilot surface 101 such that the fuel which passes the ignitor unit 103 is ignitable.

The air blast injector 104 is adapted for injecting an air blast into the inner volume. The air blast injector 104 comprises an air blast outlet which is arranged at the pilot surface 101 such that the air blast is injectable in the direction to the fuel outlet and the ignitor unit 103 for directing the fuel to the ignitor unit 103.

A combustion fluid having fuel and air streams inside the inner volume along a circumferential direction around a centre axis 105 of the pilot burner device and hence of the combustion chamber 120, for example. Along the flow direction 106 (i.e. the circumferential direction), the air blast injector 104, the fuel injector 102 and the ignitor unit 103 are arranged one after another at the pilot surface 101.

Hence, the air blast of the air blast injector 104 is directed to the fuel injector 102 and further to the ignitor unit 103. Hence, the air blast guides the injected fuel at the fuel injector outlet to the ignitor unit 103 such that more fuel is guided to the ignitor unit 103.

Specifically, the air blast injector 104 injects an air blast along an air blast injecting direction 107, wherein the air blast injecting direction 107 streams generally along the pilot surface 101. In particular, the air blast injecting direction 107 is directed at least with a (directional) component perpendicular to a normal of the pilot surface 101 and streams at least partially parallel to the pilot surface 101. Furthermore, the air blast injector 104 may inject the air blast in such a way that an air blast spray cone 108 is formed. Hence, the air blast stream comprises a larger width at the region of the fuel injector 102 and the ignitor unit 103, such that more injected fuel may be captured and directed to the ignitor unit 103.

Additionally, as shown in FIG. 5, further air blast injectors 104', each having a respective further air blast outlet 112' may be arranged to the pilot surface 101 for injecting further air blast streams in the direction to the fuel injector 102 and the ignitor unit 103. The further air blast streams may slightly differ in its direction to the air blast injecting direction 107 so that a large air blast streaming field may be generated.

Furthermore, the recess 501 with similar features as shown in FIG. 1 may be formed into the pilot body 100, wherein a further fuel injector 102 may be installed into the recess 501.

Figure 6:
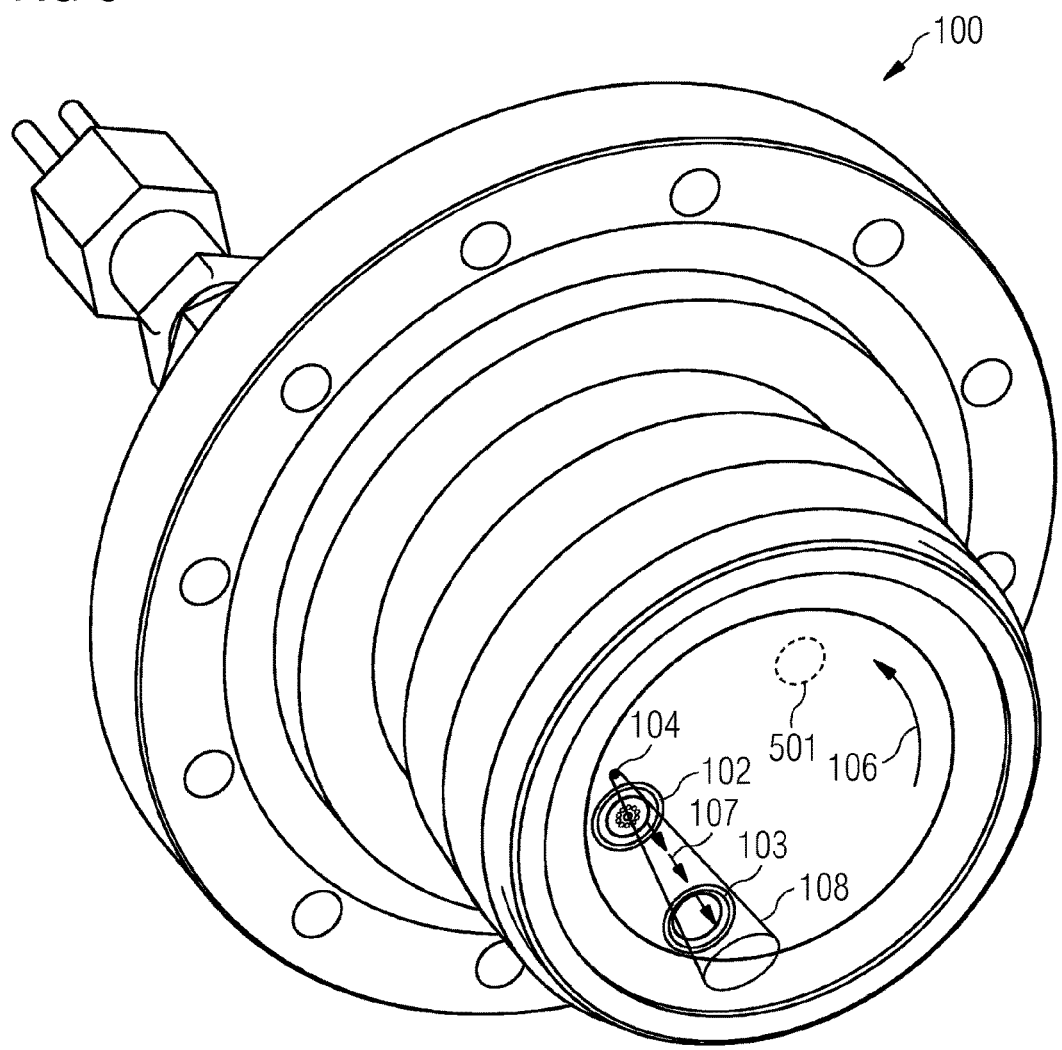
FIG. 6 shows a perspective view of a pilot burner device according to FIG. 5.

FIG. 6 shows the same features as FIG. 5, wherein in FIG. 6 a perspective view of the pilot burner device as shown in FIG. 5 is shown.

Figure 7:
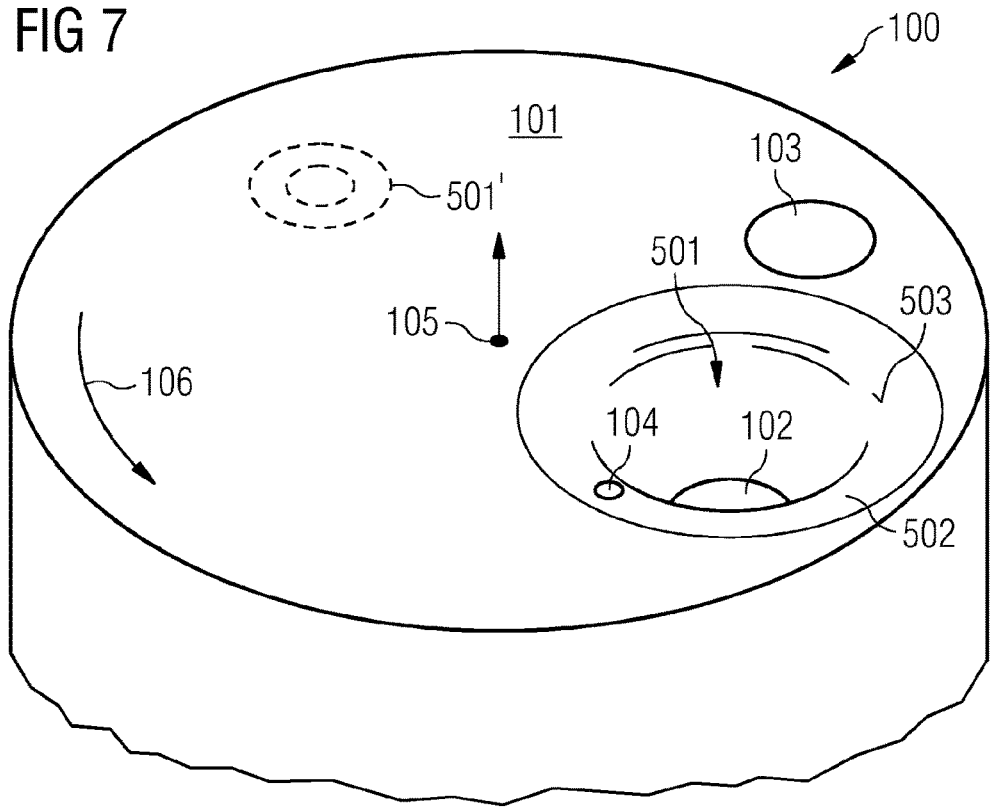
FIG. 7 shows a perspective view of a pilot burner device comprising a recess with curved lateral surfaces according to an exemplary embodiment of the present invention.

FIG. 7 shows an exemplary embodiment of the combustion chamber 120 and the pilot burner device as shown in FIG. 1. As can be taken from FIG. 7, the lateral surface 503 may comprise a curved shape, in particular in a convex shape. As can be taken from FIG. 7, the flow direction 106 of the fluid inside the inner volume flows along a circumferential direction around the centre axis 105. At the base area 502, the fuel injector 102 is installed. The air blast injector 104 is installed at the lateral face 503 such that an air blast is injected along the circumferential direction (flow direction 106) to the fuel injector 102 and further to the ignitor unit 103. The ignitor unit 103 is located onto the pilot surface 101 of the combustion chamber 120.

As can be taken from FIG. 7, the base area 502 may be a hole through which the fuel injector 102 is attachable, such that the fuel outlet is arranged within the base area 502. Furthermore, a further recess 501' into which a further fuel injector may be installed may be formed into the pilot body 101. In particular, along the circumferential direction around the centre axis 105, a plurality of recesses 501, 501' may be formed into the pilot body 101.

Figure 8:
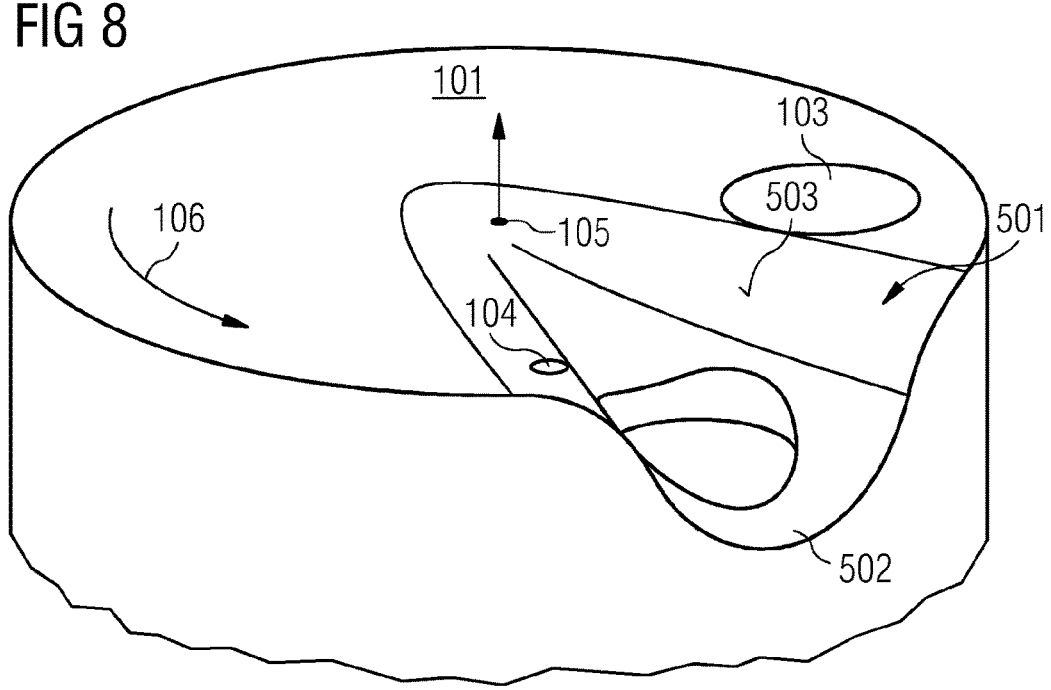
FIG. 8 shows a perspective view of a pilot burner device comprising a recess with a groove-like shape, according to an exemplary embodiment of the present invention.
Figure 9:
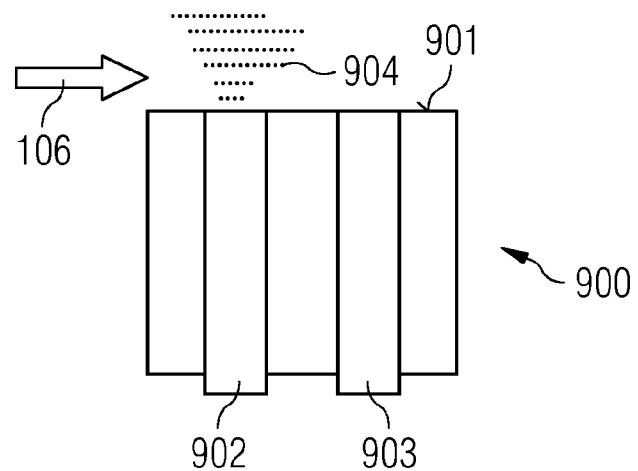
FIG. 9 shows a conventional pilot burner device.

FIG. 8 shows a pilot burner body 100 with the same features as shown in FIG. 7, whereas the recess 501 is formed with a groove-like profile which has an open area in the side surface of the pilot burner body 100. The groove shaped recess 501 as shown in FIG. 8 may be easier to manufacture with respect to the tubular and donut-like shaped recess 501 as shown in FIG. 7.

The invention claimed is:

1. A combustion chamber for a gas turbine, the combustion chamber comprising
   a pilot burner device comprising a pilot body with a pilot surface which is facing an inner volume of the combustion chamber, wherein the pilot burner device further comprises a centre axis,
   a fuel injector comprising a fuel outlet for injecting a fuel into the inner volume, an ignitor unit for igniting the fuel inside the inner volume, wherein the ignitor unit is arranged at the pilot surface such that fuel which passes the ignitor unit is ignitable, wherein the pilot body comprises a recess comprising a base area spaced from a section of the pilot surface surrounding the recess and a lateral surface that connects the base area to the pilot surface, wherein the fuel outlet is arranged within the recess, and wherein the recess is located off-centred from the centre axis, and an air blast injector for injecting an air blast into the inner volume, wherein the ignitor unit is located outside of the recess, wherein the air blast injector comprises an air blast outlet which is arranged in the recess and arranged circumferentially adjacent to the fuel outlet with respect to a circumferential direction of the combustion chamber, and wherein the air blast injector is configured to direct the air blast in the circumferential direction toward the fuel outlet and then the ignitor unit, which is effective to direct the fuel to the ignitor unit.

2. The combustion chamber according to claim 1, wherein the fuel outlet is arranged at a bottom surface of the recess.

3. The combustion chamber according to claim 1, wherein the fuel outlet is arranged at the lateral surface.

4. The combustion chamber according to claim 1, wherein the lateral surface comprises a curved shape.

5. The combustion chamber according to claim 1, wherein the base area comprises a circular, elliptical or rectangular profile.

6. The combustion chamber according to claim 1, wherein the fuel injector, the ignitor unit and the air blast injector are arranged along the circumferential direction around the centre axis of the pilot burner device.

7. The combustion chamber according to claim 1, wherein the fuel injector comprises a fuel nozzle at the fuel outlet such that the fuel is injectable in an atomized manner.

8. The combustion chamber according to claim 1, wherein the air blast outlet is formed for injecting the air blast with an air blast spray cone.

9. The combustion chamber according to claim 1, wherein the pilot body comprises a first passage which connects the inner volume with an environment of the pilot burner device, wherein the fuel injector is inserted into the first passage, wherein the pilot body further comprises a second passage which connects the inner volume with the environment of the pilot burner device, wherein the air blast injector is inserted into the second passage.

10. The combustion chamber according to claim 8, wherein the pilot body comprises a common passage which connects the inner volume with an environment of the pilot burner device, wherein the fuel injector and the air blast injector are inserted into the common passage.

11. A method for operating a combustion chamber, the method comprising injecting a fuel into an inner volume of the combustion chamber by a fuel injector comprising a fuel outlet, wherein the combustion chamber comprises a pilot burner device comprising a pilot body with a pilot surface which is exposable to a flame in the inner volume of the combustion chamber and a recess comprising a base area spaced from a section of the pilot surface surrounding the recess and a lateral surface that connects the base area to the pilot surface, igniting the fuel inside the inner volume by an ignitor unit, wherein the ignitor unit is arranged at the pilot surface such that fuel which passes the ignitor unit is ignitable, wherein the fuel outlet is formed for directing the fuel in the direction to the ignitor unit, wherein the fuel outlet is arranged inside the recess, wherein the ignitor unit is located outside of the recess, and directing an air blast into the inner volume of the combustion chamber by an air blast injector located in the recess and comprising an air blast outlet arranged at the pilot surface or at the base area and arranged circumferentially adjacent to the fuel outlet with respect to a circumferential direction of the combustion chamber, wherein the air blast injector is configured to direct the air blast in the circumferential direction toward the fuel outlet and then the ignitor unit, which is effective to direct the fuel to the ignitor unit.

12. A combustion chamber for a gas turbine, the combustion chamber comprising a pilot burner device comprising a pilot body with a pilot surface which is facing an inner volume of the combustion chamber, wherein the pilot burner device further comprises a centre axis, a fuel injector comprising a fuel outlet for injecting a fuel into the inner volume, an ignitor unit for igniting the fuel inside the inner volume, wherein the ignitor unit is arranged at the pilot surface such that fuel which passes the ignitor unit is ignitable, wherein the pilot body comprises a recess comprising a base area spaced from a section of the pilot surface surrounding the recess and a lateral surface that connects the base area to the pilot surface, wherein the fuel outlet is arranged within the recess, and wherein the recess is located off-centred from the centre axis, and an air blast injector for injecting an air blast into the inner volume, wherein the ignitor unit is located in the recess, wherein the air blast injector comprises an air blast outlet which is arranged outside of the recess and arranged circumferentially adjacent to the fuel outlet with respect to a circumferential direction of the combustion chamber, and wherein the air blast injector is configured to direct the air blast in the circumferential direction toward the fuel outlet and then the ignitor unit, which is effective to direct the fuel to the ignitor unit.

13. The combustion chamber according to claim 12, further comprising a further air blast injector for injecting a further air blast into the inner volume, and wherein the further air blast injector comprises a further air blast outlet which is arranged at the pilot body such that the further air blast is injectable in the direction to the fuel outlet and the ignitor unit for directing the fuel to the ignitor unit.

* * * * *